(12) United States Patent
Ku et al.

(10) Patent No.: US 7,300,262 B2
(45) Date of Patent: Nov. 27, 2007

(54) HEAT DISSIPATION FAN

(75) Inventors: Chin-Long Ku, Tu-Cheng (TW); Chin-Wen Yeh, Tu-Cheng (TW); Chuan-Chen Wang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 376 days.

(21) Appl. No.: 10/977,822

(22) Filed: Oct. 29, 2004

(65) Prior Publication Data

US 2006/0012255 A1    Jan. 19, 2006

(30) Foreign Application Priority Data

Jul. 16, 2004    (CN) .................... 2004 1 0028186

(51) Int. Cl.
*F04B 17/00* (2006.01)

(52) U.S. Cl. .................... 417/366; 417/354; 310/67 R; 310/58

(58) Field of Classification Search ................ 417/366, 417/423.1, 354, 369, 370, 371; 310/67 R, 310/58, 59, 261
See application file for complete search history.

(56) References Cited

U.S. PATENT DOCUMENTS

| | | | |
|---|---|---|---|
| 2,091,510 A | * | 8/1937 | Lanz .................... 417/354 |
| 4,686,400 A | * | 8/1987 | Fujisaki et al. ........... 310/67 R |
| 6,386,276 B1 | * | 5/2002 | Chen et al. ................. 165/121 |
| 6,773,239 B2 | * | 8/2004 | Huang et al. ............... 417/354 |
| 2002/0141866 A1 | * | 10/2002 | Huang et al. ............... 415/220 |
| 2004/0075356 A1 | | 4/2004 | Horng et al. .......... 310/154.08 |

FOREIGN PATENT DOCUMENTS

TW           500190          8/2002

* cited by examiner

*Primary Examiner*—Anthony Stashick
*Assistant Examiner*—Vikansha Dwivedi
(74) *Attorney, Agent, or Firm*—Morris Manning Martin LLP; Tim Tingkang Xia, Esq.

(57) ABSTRACT

A heat dissipation fan includes a rotor (1) having a hub (10) with a permanent magnet (104) attached to an inner surface thereof, a stator (2) and a fan frame (3) having a bearing seat (36). The bearing seat (36) includes a base (361) and a central tube (362) around which the stator is mounted. Slots (102) are defined through the top wall of the hub facing to the magnet ring. The base defines slots (360), corresponding to the slots of the hub.

8 Claims, 4 Drawing Sheets

HEAT DISSIPATION FAN

TECHNICAL FIELD

The present invention relates to a fan, and more particularly to a heat dissipation fan having a permanent magnet easily to be assembled and disassembled.

BACKGROUND

Referring to FIG. 5, a conventional fan mainly comprises a rotor 1', a stator 2', and a housing 3'. The rotor 1' comprises a hub 10' with a close end wall and a mouth opposing the close end wall. A number of blades 11' extend radially outward from the hub 10'. A permanent magnet 104' is fixedly mounted to the inner surface of the hub 10' via the mouth after the hub 10' is formed. However, it is very hard to accurately locate the permanent magnet 104' in the hub 10'. Furthermore, when any components of the rotor 1' other than the permanent magnet 104' is damaged, it is not convenient for tools to enter into the hub 10' from the mouth of the hub 10' to detach the permanent magnet 104' from the hub 10'.

Moreover, in operation of the fan, coils of the stator 2' are electrified to allow the rotor 1' to rotate circumambiently around the stator 2'. Therefore, coils of the stator 2' generate heat continuously. The heat generated by the coil due to electrification of the fan will accumulate within the fan if it is not removed efficiently, which leads to the damage of the fan.

An improved fan that overcomes the above-mentioned disadvantages is desired.

SUMMARY OF THE INVENTION

Accordingly, an object of the present invention is to provide a heat dissipation fan having a permanent magnet easily to be assembled and disassembled.

Another object of the present invention is to provide a heat dissipation fan which can dissipate internal heat generated by the heat dissipating fan.

To achieve the above-mentioned objects, a heat dissipation fan comprises a rotor having a hub with a permanent magnet attached to an inner surface thereof, a stator and a fan frame having a bearing seat. The bearing seat comprises a base and a central tube around which the stator is mounted. Slots are defined through the top wall of the hub facing to the magnet ring. The base defines corresponding slots, corresponding to the slots of the hub.

Other objects, advantages and novel features of the present invention will be drawn from the following detailed description of the preferred embodiments of the present invention with attached drawings, in which:

DETAILED DESCRIPTION OF PREFERRED EMBODIMENTS

Figure 1:
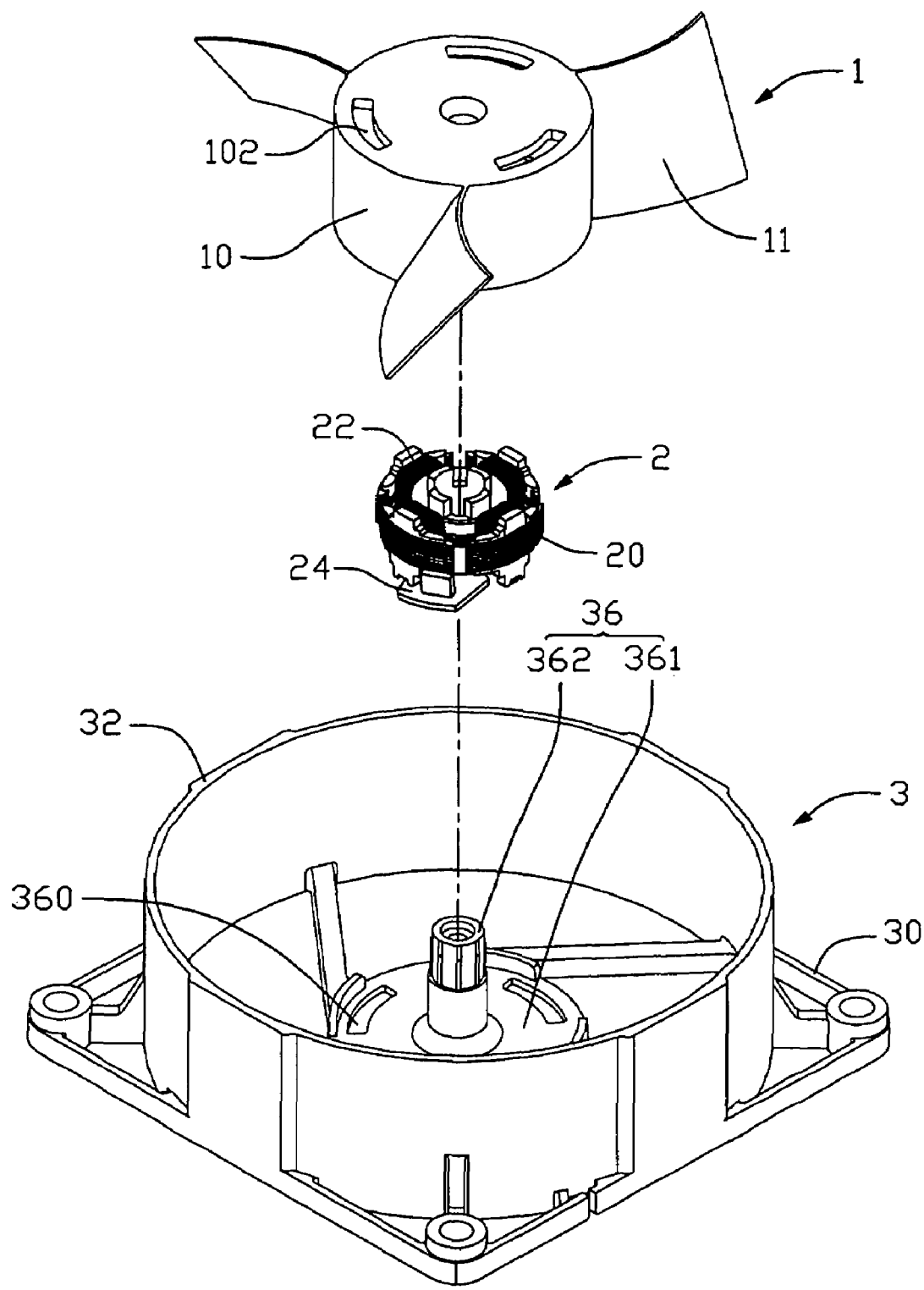
FIG. 1 is an exploded, isometric view of a heat dissipation fan in accordance with the preferred embodiment of the present invention.
Figure 2:
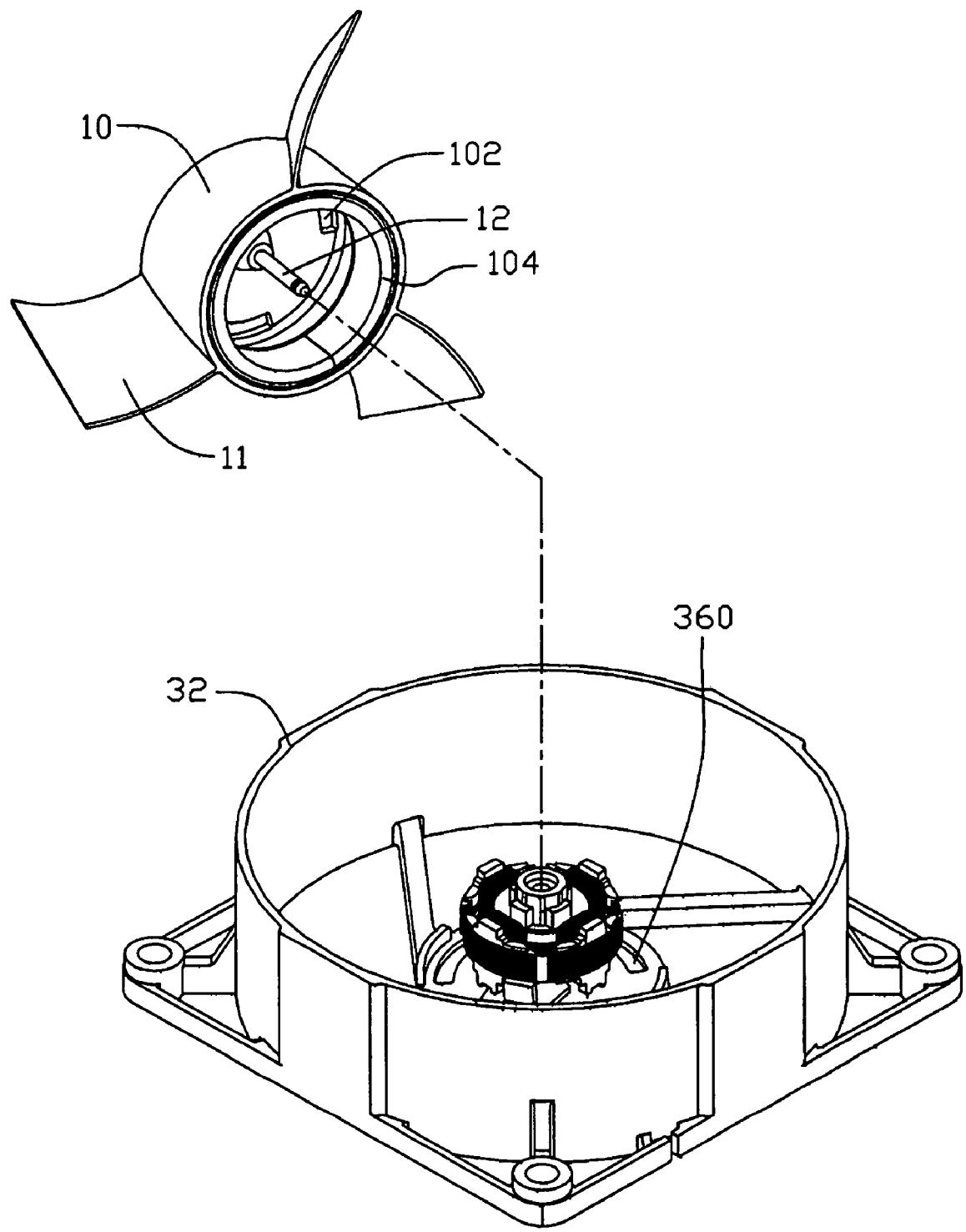
FIG. 2 is a partly exploded, isometric view of a heat dissipation fan viewed from another aspect.

Referring to FIG. 1 and FIG. 2, a heat dissipation fan includes a motor and a fan frame 3. The motor comprises a rotor 1 and a stator 2.

The rotor 1 comprises a hub 10 having a circular top wall and a circumferential wall depending from the top wall. The hub 10 comprises a central shaft 12 and a set of blades 11 extending radially outward from the shaft 12. A permanent magnet 104 is attached to an inner surface of the circumferential wall of the hub 10. A plurality of splaced slots 102 is defined through the top wall of the hub 10 over the permanent magnet 104. The slots 102 are located at an concentric circle and elongated in the circumferential direction of the circle for facilitating an auxiliary tool to enter into the hub 10 from above the hub 10. The permanent magnet 104 is mounted in the hub 10 from the bottom of the hub 10 by means of the auxiliary tool (not shown) that extends through the slots 102 to locate the permanent magnet 104 in the hub 10. Thus, an acceptable precision is achieved.

The stator comprises a core 20, a coil 22 and a circuit board 24 having a circuit to control the motor.

The fan frame 3 is formed from a plastic material, and comprises a pedestal 30 and a cylindrical wall 32 extending upwardly from the edge of the pedestal 30. The pedestal 30 comprises a bearing seat 36. The bearing seat 36 comprises a base 361 and a central tube 362 extending upwardly from the top surface of the base 361. Slots 360 corresponding to the slots 102 of the hub 10 are defined in the base 361 beneath the hub 10.

Figure 3:
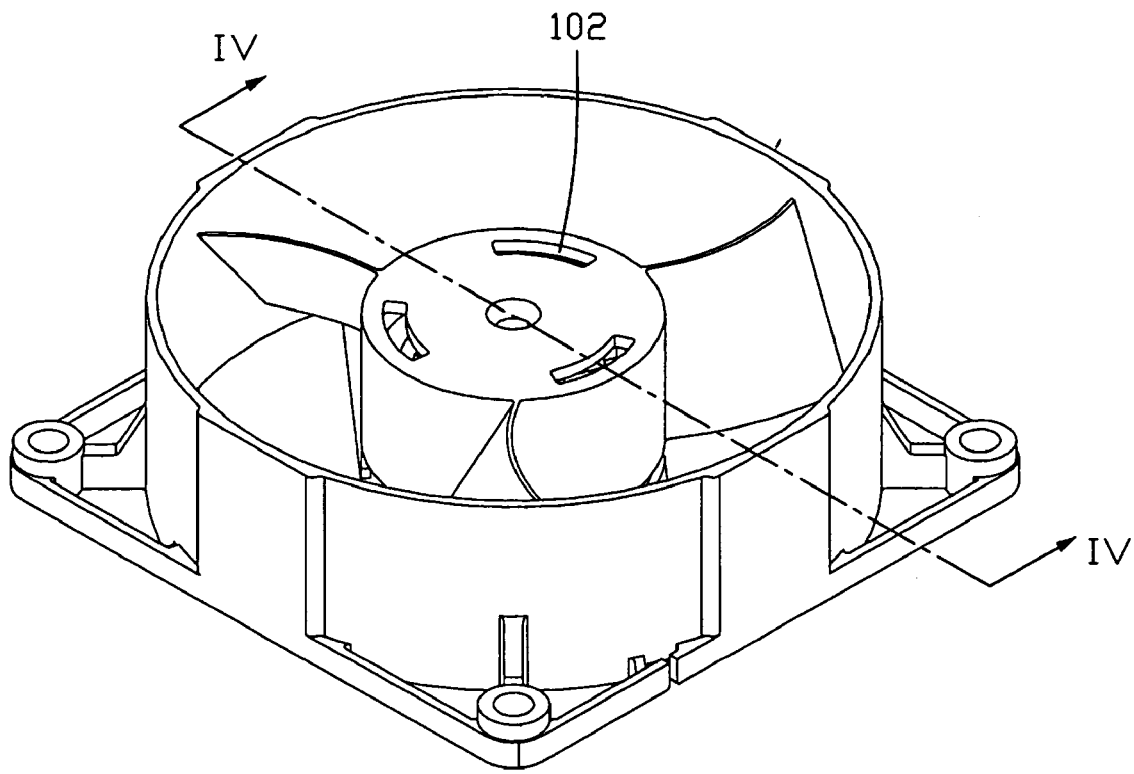
FIG. 3 is an assembled, isometric view of FIG. 1.
Figure 4:
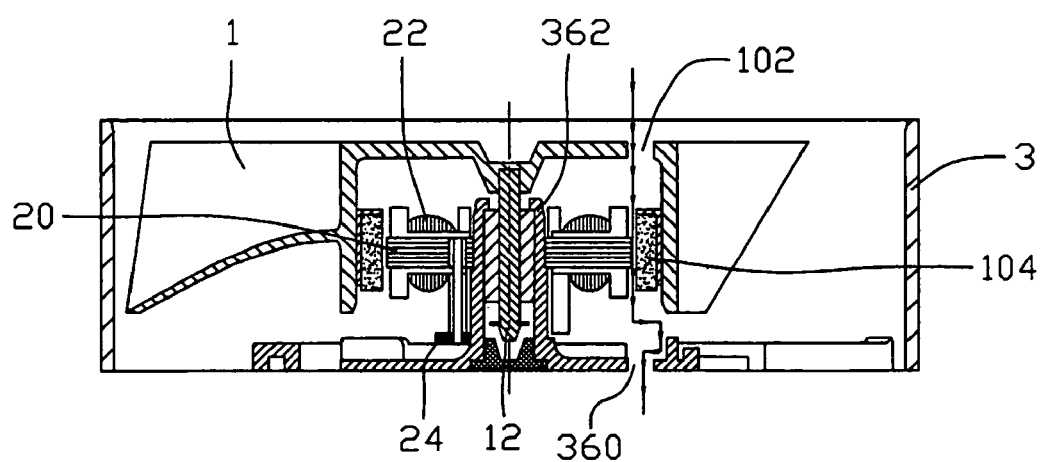
FIG. 4 is a cross-sectional view of the heat dissipation fan along line III-III as shown in FIG. 3.
Figure 5:
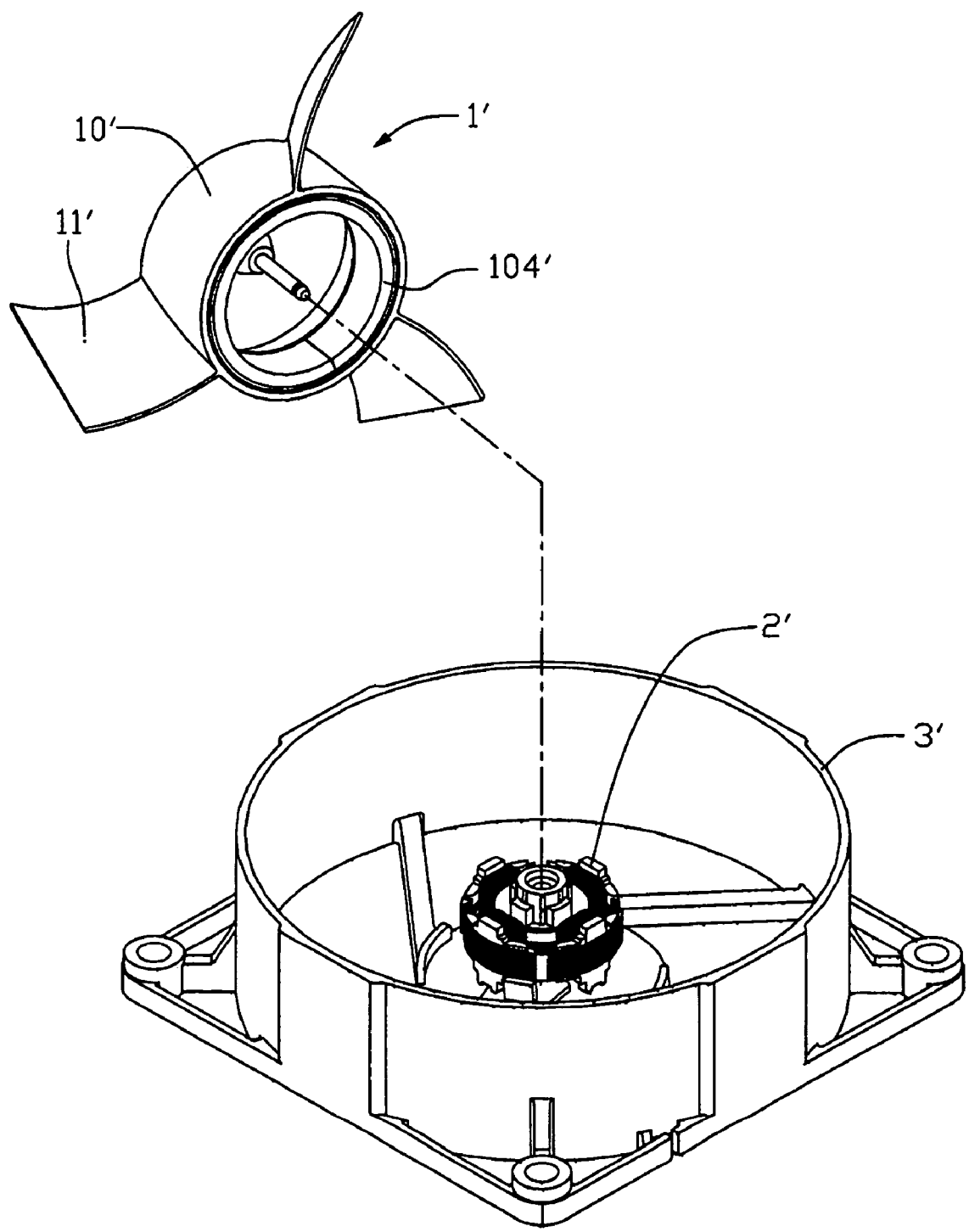
FIG. 5 is a partly exploded, isometric view of a conventional fan.

Referring to FIGS. 3-5, the stator 2 is mounted on the outer periphery of the bearing seat 36. The shaft 12 of the rotor 1 is inserted in the central tube 362 and the permanent magnet surrounds and confronts the stator 2. The slots 360 of the fan frame 3 align with the corresponding slots 102 of the hub 10. When the heat dissipation fan is in operation, the coil 20 is electrified to generate magnetic field which interacts with the permanent magnet 104 of the rotor 1 to drive the rotor 1 to rotate. Ambient air is forced into the hub 10 via the slots 102 and out of the hub 10 via the slots 360. Internal heat generated by the stator 2 is carried away by the ambient air.

In the heat dissipation fan described above, when any components of the rotor 1 other than the permanent magnet 104 is damaged, the permanent magnet 104 can be easily pushed out of the hub 10 by a tool that extends through the slots 102 of the hub 10 so that the permanent magnet 104 is recycled and the cost is saved.

It is understood that the invention may be embodied in other forms without departing from the spirit thereof. The above-described examples and embodiments are to be considered in all respects as illustrative and not restrictive, and the invention is not to be limited to the details given above.

What is claimed is:

1. A heat dissipation fan comprising:
   a stator comprising a core, a coil and a circuit board;
   a rotor surrounding the stator and comprising a hub having a top wall and a circumferential wall depending from the top wall, a permanent magnet being attached to an inner surface of the circumferential wall, slots being defined through the top wall of the hub and facing the permanent magnet for facilitating assembling and disassembling the magnet; and a fan frame having a bearing seat, the bearing seat comprising a base and a central tube around which the stator is mounted, the base defining slots corresponding to the slots of the hub;

wherein outer air is capable of being forced into the hub via the slots of one of the hub and the base and out of the hub via the slots of the other of the hub and the base to create an airflow through the stator thereby carrying away heat generated by the stator.

2. The heat dissipation fan described in claim 1, wherein each of the slots of the hub aligns with a corresponding one of the slots of the base of the fan frame.

3. A fan comprising:

a fan frame comprising a base and a bearing seat extending upwardly from the base;

a stator attachably surrounding the bearing seat;

a rotor having a shaft entering into and rotatable in the bearing seat, and a hub mounted therein with a permanent magnet confronting the stator; and at least a pair of slots being respectively defined in the hub and the base beneath the hub to create an passage for airflow flowing through the stator to cool the stator.

4. The fan described in claim 3, wherein one of said a pair of slots is located over the magnet for facilitating disassembling of the magnet.

5. A fan comprising:

a fan frame;

a stator attached to said fan frame;

a rotor rotatably attached to said fan frame to form a stator-receiving space between said rotor and said fan frame, and having a permanent magnet disposed around said stator so as to be rotarily drivable by said stator after electrification of said fan; and at least one slot formed on said rotor and at least one corresponding slot formed on said fan frame, and said at least one slot and corresponding slot located at two opposite sides of said stator respectively and aligned with said stator so as to form a linear air-circulative path through said at least one slot and corresponding slot.

6. The heat dissipation fan described in claim 1, wherein the slots defined through the top wall of the hub are located at a concentric circle and elongated in a circumferential direction of the circle.

7. The fan described in claim 3, wherein the slot defined in the hub is defined through a top wall of the hub and located at a concentric circle, the slot defined in the hub being elongated in a circumferential direction of the circle, adapted for facilitating a tool to enter into the hub to assemble and disassemble the permanent magnet to and from the hub.

8. The fan described in claim 5, wherein the at least one slot formed on said rotor is defined through a top wall of a hub of the rotor and located at a concentric circle, the at least one slot being elongated in a circumferential direction of the circle, adapted for facilitating a tool to enter into the hub to assemble and disassemble the permanent magnet to and from the rotor.

* * * * *